April 10, 1934.     W. GUMPRICH     1,954,045
READING DEVICE FOR A SCALE
Filed Feb. 6, 1930
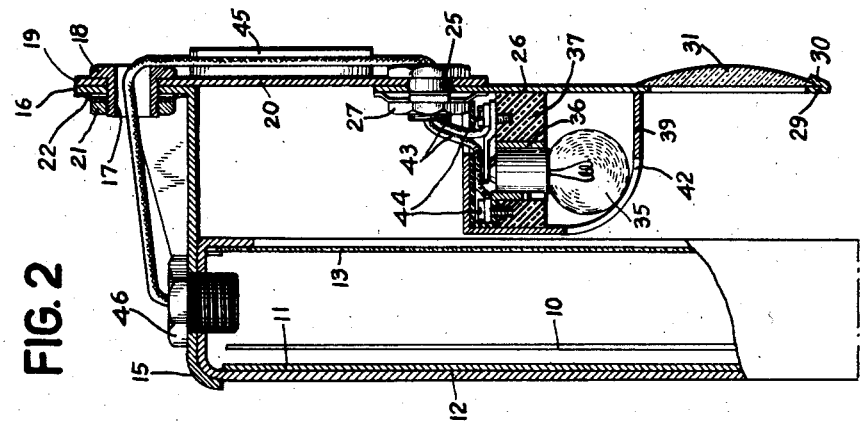
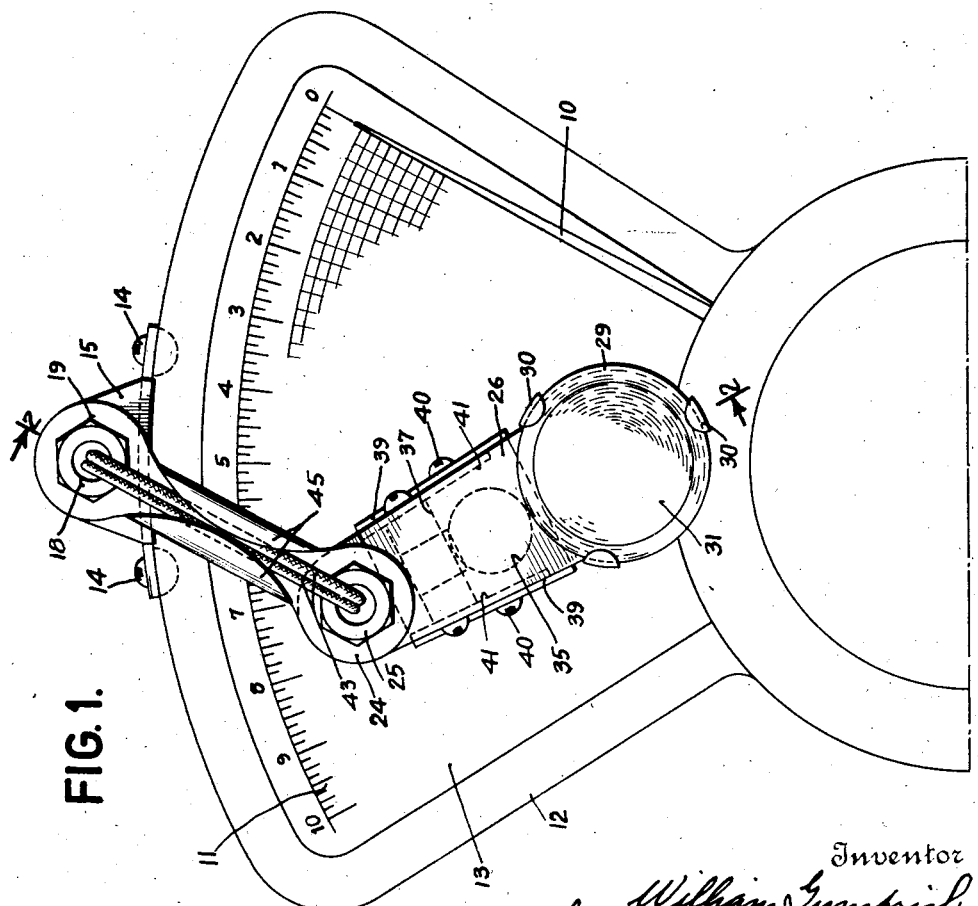
Inventor
William Gumprich
By his Attorney
W. M. Wilson Patented Apr. 10, 1934

1,954,045

UNITED STATES PATENT OFFICE 1,954,045

READING DEVICE FOR A SCALE

William Gumprich, Binghamton, N. Y., assignor, by mesne assignments, to International Business Machines Corporation, New York, N. Y., a corporation of New York Application February 6, 1930, Serial No. 426,313

5 Claims. (Cl. 88—39)

This case relates to weighing and computing scales and particularly to a reading device therefor.

The charts of weighing and computing scales are usually marked with so great a number of indications as to make accurate and clear readings almost impossible.

In the drum type of scale, a magnifying glass may be located in the sight opening of the casing to magnify the drum chart reading. It is obviously impractical to similarly magnify the indications of a fan, dial, or similar type of scale as the sight opening in such scales is ordinarily of the same dimensions as the chart.

The object of the present invention is to provide novel magnifying means for a fan, dial, or similar type of scale chart.

More specifically, the object of the invention is to provide a magnifying glass movable over any point of the chart to magnify the indications at said point.

Another object is to provide illuminating means for illuminating the portion of the chart to be read.

Various other objects and advantages of my invention will be obvious from the following particular description of one form of mechanism embodying the invention or from an inspection of the accompanying drawing; and the invention also constitutes certain new and novel features of construction and combination of parts hereinafter set forth and claimed.

In the drawing:

Fig. 1 is a front view of the upper part of the fan scale, and

Fig. 2 is a section on line 2—2 of Fig. 1.

The invention has been shown as applied, for an example, to a fan-type scale, although it is clear that application of the invention may be made to dial or similar scales.

In detail, the pointer 10 of the scale is actuated in accordance with the load through any suitable weighing mechanism. The pointer scans the usual fan chart 11 provided with a plurality of rows of price computations, both pointer and fan being housed in a fan-shaped casing 12 closed by a transparent window 13 through which the pointer and chart may be viewed.

Attached by screws 14 to the top of housing 12 is a bracket 15 having a vertical portion 16 provided with a circular hole through which freely passes the hollow threaded stud 17. Rotatably mounted on the stud, between the head 18 thereof and the vertical portion 16 of the bracket is the enlarged upper end 19 of a sheet metal member 20. Seated on the stud, between the vertical portion 16 of the bracket and a nut 21 threaded on the end of bolt 17 is a disk or washer 22 of springy material. The above parts constitute an adjustable friction joint whereby member 20 may be swiveled on stud 17 relative to vertical portion 16 of the bracket 15 and remain in any position to which it is set.

The lower end 24 of member 20 is also enlarged and provided with a round hole through which freely passes the hollow threaded stud 25 similar to stud 17. Rotatably mounted on stud 25 is a plate 26 which contacts end 24 of member 20 at the side thereof opposite that in contact with the head of the stud 25. A nut 27 on the threaded end of the stud serves to adjust the friction of a spring washer 28 against the plate 26. The latter plate is thus frictionally swiveled on stud 25 relative to member 20 and will stay in any position to which it is set.

The lower end of plate 26 is formed as an annulus 29 having bent up from the periphery thereof integral tabs 30 which serve to hold a magnifying glass 31 in position against the surface of the annulus.

By grasping annulus 29 and moving it directly to a desired position, the magnifying glass 31 may be placed over any desired point of the chart. The swiveled connections between plate 26 and member 20 and between the latter and bracket 15 permit universal and flexible movement of the lens holder to any point of the chart.

In order to illuminate the part of the chart to be magnified, which while not essential, is desirable, a lamp 35 is carried in a socket 36 fixed in a base 37 of insulating material.

The base 37 and lamp 35 are enclosed by a casing 39 which is fastened by screws 40 to the sides 41 of the plate 26 (see Fig. 1).

The lower rear end of casing 39 has a hole 42 through which lamp 35 casts light on the chart 11. The front of plate 26 acts as a shield to prevent the light from directly striking the eyes of the observer.

Lead wires 43 go from terminals 44 of the socket through the hollow bolt 25, within the channel formed by folding over the sides 45 of member 20, through the hollow bolt 17 and to a plug 46 on bracket 15. The plug may be connected through an ordinary light switch to the light wires of the store or it may be wired to contacts within the scale housing which close automatically when a load is placed on the platform, as is well known in the art.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention therefore to be limited only as indicated by the scope of the following claims.

I claim:

1. In a scale, a graduated chart, a protective housing substantially completely enclosing the chart and including a transparent front closure spaced from the chart, an index movable between the closure and chart for reading the latter, a bracket fixed to a wall of the housing, a linkage pivotally connected at its upper end to the bracket, a magnifying lens for magnifying the reading of the chart by said index, and a holding frame for the lens comprising integrally folded clips formed on the free end of the lower link of said linkage to receive portions of the margin of the lens.

2. In a scale, a generally vertically disposed graduated chart, a protective housing therefor including a transparent window through which the chart is visible, a chart magnifying lens, a linkage movable in front of the chart and including a link pivotally connected to said housing and a link having means for rigidly carrying said lens, said links being pivotally joined, and frictional means at the pivotal joints between the links and between the linkage and housing for frictionally opposing pivotal movement of the links out of adjusted positions under the influence of gravity.

3. A scale comprising a chart, an enclosing protective housing therefor, a magnifying lens for magnifying chart portions, a linkage flexibly connecting the lens to the housing, the pivotal joints of said linkage being hollow, an illuminating device for the chart carried by the linkage between the lens and chart to illuminate the magnified portions of the chart, and lead-in wires for the illuminating means passing from the outer side of the linkage to the side between the lens and chart through said hollow pivotal joints.

4. In a scale, a generally vertically disposed graduated chart, a protective housing therefor, a lens for magnifying the chart graduations, a first member movably connected to the housing to move relative to the latter in a generally vertical plane, a second member carrying the lens, an unthreaded journal connection between the first and second members to connect the second member for relative movement in a generally vertical plane; and means for providing frictional coaction between said members at the journal connection for opposing free relative movement of the members under the influence of gravity.

5. In a scale, a generally vertically disposed graduated chart, a protective housing member therefor, a lens for magnifying the chart, a first link member pivotally connected to the housing member, a second link member pivotally connected to the first link member at one end and rigidly carrying the lens at the other end, the pivotal connections between said members comprising short axles or shafts extending transversely to the chart and having unthreaded peripheral portions, the adjacent pivotally connected members being rotatable on the unthreaded portion of one of said shafts in a plane generally parallel to the chart and having flat abutting faces surrounding the shaft, said shafts having a threaded terminal portion, and a nut threaded on the terminal portion to adjust the frictional contact between the abutting faces to provide sufficient friction to oppose free relative movement of the members under the influence of gravity.

WILLIAM GUMPRICH.